Patented Aug. 6, 1940

2,210,481

UNITED STATES PATENT OFFICE 2,210,481

AQUEOUS DISPERSION OF HARDENED PROTEIN

George H. Brother and Allan K. Smith, Urbana, Ill., assignors to Henry A. Wallace, as Secretary of Agriculture of the United States of America, and his successors in office No Drawing. Application May 16, 1938, Serial No. 208,260

2 Claims. (Cl. 134—12)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

The object of our invention is the dispersion of protein or protein material in the medium of a hardening, tanning, or curing agent.

Another object of our invention is the production of a protein dispersion, similar in use and application to regular protein dispersions, but which will after application dry to hardened protein coats or films without any subsequent treatment.

Another object of our invention is the production of a protein dispersion in which the state of the protein shall be such that when it has been deposited as a film, coating, fiber, or the like, and dried, it will be found to be completely and homogeneously hardened, superior in this respect to protein films deposited from any dispersion up to this time.

The foregoing objectives are accomplished, according to our invention, by dispersing protein material such as soybean meal or protein, cottonseed meal or protein, linseed meal or protein, peanut meal or protein, gluten, other vegetable protein material, or animal protein such as casein from milk, albumins, glue gelatin or the like, in aqueous solutions of hardening or tanning agents, such as aldehydes, ketones, chromium salts, or the like, adjusted to the proper pH and with or without a salt present to aid in the dispersion.

It has long been known and recognized that although protein adhesives and coatings had good strength, they were readily affected by water. In consequence, there have been numerous attempts made to remedy this weakness, among which may be mentioned the addition of lime to the alkaline dispersion. To this, other agents have been added, such as copper, zinc, manganese or aluminum salts; fluorides, silicates, chromates, or permanganates; carbon disulphide, other thio compounds, chloroform, or carbon tetrachloride. Although these modifications probably improve the material, they are evidently not very satisfactory, as recently modifications from a different angle are quite numerous.

These appear to be attempts to secure complete and homogeneous hardening of the protein film by mild tanning agents or by incorporating powerful agents, together with an inhibitor, so that the action may be delayed long enough to permit application before it is started. Examples are mixtures of protein with phenol and formaldehyde (U. S. 1,245,981, 1,245,982, Nov. 6, 1917, Sadakichi Satow. 2,095,093, Oct. 5, 1937, L. J. Fuhrmann); cresylic acid and formaldehyde (U. S. 2,068,759, Jan. 26, 1937, J. V. Nevin); urea and formaldehyde (U. S. 2,014,167, Sept. 10, 1935, A. H. Bowen. U. S. 1,895,447, Jan. 31, 1933, E. F. Christopher and F. L. DeBeukelaer); glycerine-phthalate resin and formaldehyde (U. S. 1,978,406, Oct. 30, 1934, C. M. Boyce); paraformaldehyde (U. S. 1,459,541, June 19, 1923, A. C. Lindauer, U. S. 1,506,013, Aug. 26, 1924, A. C. Lindauer and G. M. Hunt. U. S. 1,712,077, May 7, 1929, C. E. Hrubesky and F. L. Browne); hexamethylenetetramine (U. S. 1,994,050, Mar. 12, 1935, T. Satow. U. S. 1,892,980, Jan. 3, 1933, H. H. Edwards); sodium formaldehyde sulphoxylate (U. S. 1,373,412, Apr. 5, 1921, A. E. Craver); formaldehyde bisulphite (U. S. 1,950,060, Mar. 6, 1934, G. H. Osgood); sulphocyanate and formaldehyde (U. S. 1,964,960, July 3, 1934, G. G. Pierson); formamide and formaldehyde (U. S. 2,101,574, Dec. 7, 1937, C. Dangelmajer); alum (U. S. 1,854,700, Apr. 19, 1932, I. F. Laucks and G. Davidson. U. S. 2,089,480, Aug. 10, 1937, C. C. Heritage. There is also a patent covering the dispersion of protein (casein) in aqueous solutions of aluminum formate, Brit. 469,824, Aug. 3, 1937, Victor Chem. Co.). A process is described in U. S. 1,976,435, Oct. 9, 1934, C. N. Cone and H. Galber, calling for the addition of formaldehyde to dispersions of soybean meal and/or blood albumen, in order to thicken these for a special application. This thickening, in reality a coagulation, shortens the life of an adhesive (U. S. 2,014,167), and its shortcomings are recognized by others (U. S. 1,964,960 and U. S. 1,994,050). It has been proposed to disperse protein in caustic aqueous solution as is common and add to this dispersion aldehydes with or without retarders, in order to give a more water resistant finish (U. S. 1,895,433, Jan. 24, 1933, Lawrence Bradshaw). It is shown here that it is very difficult to obtain the desired mixture as the aldehydes which give the greatest water resistance coagulate the protein most readily. Formaldehyde is entirely disclaimed, as are polymerization products of it, as being too powerful to keep under control. From data given in the patent, it would appear that crotonaldehyde was not very satisfactory for their application and propionaldehyde is not mentioned.

It has been proposed to extract crude corn gluten with formaldehyde and an acid (Fr. 818,031, Sept. 16, 1937, Int. Pat. Dev. Co.) to yield a material that may be used as an adhesive or hardened by heat to form a plastic. Cohn, Berggren, and Henry (J. Gen. Physiol., 7, 81-98 (1924)) have shown that zein, the principal protein of crude corn gluten, does not disperse in dilute acid solutions. This has been checked by results obtained but not as yet published by us. Strong acids (40 percent to 100 percent acetic, formic, phosphoric, hydrochloric, etc. (U. S. 691,383, U. S. 1,245,976, and U. S. 1,280,862) are claimed to disperse zein. However, it has been demonstrated that formaldehyde in strong acid solution does not produce the same type of hardened protein material, but gives a product of about the water absorption of untreated protein.

From this it is obvious that there is need for protein dispersions that will dry to waterproof films and it is also obvious there has not been developed up to this time a very satisfactory product. It has been clearly evident that the hope of the trade has been to find some agent or some process which would make it possible to apply the material by the usual methods and then have it set up or harden in position. The strongest hardening agent is generally accepted to be formaldehyde, and the number of modified protein-formaldehyde combinations in this specification will be noted.

Our invention differs from all previous work done along this line in that we extract the protein, i. e., form the protein dispersion with the hardening agent, such as formaldehyde, present in the solution, while others formed the dispersion and added the hardening agent to the dispersion, with the exception of Fr. 818,031, which we have shown does not deal with a hardened protein. The addition of a strong hardening agent, such as formaldehyde, to a protein dispersion causes a thickening, gelling, or coagulation of the dispersion even when added in small amount. For a few special applications this may be an advantage (U. S. 1,976,435), but in general it is a rather serious handicap. On the other hand, the dispersion produced in accordance with our invention shows little tendency to gel, even at high concentrations of formaldehyde and protein. In a 10-percent aqueous solution of formaldehyde, adjusted to various pH values by the addition of hydrochloric acid or caustic soda, protein was dispersed from solvent-extracted soybean meal as follows, the quantity extracted being expressed as percent of the total nitrogen: At pH 0.95, 60 percent; 2.75, 39 percent; 3.2, 6.5 percent; 5.0, 6.7 percent; 5.6, 29.5 percent; 6.4, 48 percent; 7.2, 65 percent. These extractions were all made at room temperature and at a concentration of 2.5 g. meal to 100 cc. of the extracting solution. Commercial soybean protein was similarly treated and was found to give practically analogous results, the figures for the protein being slightly higher at acid pH ranges, lower through the isoelectric range, and lower through alkaline range. In no case was a thick dispersion produced. There was no evidence of gelling; on the contrary, the dispersions were all quite thin and watery.

It is noticeable from the data given above that the maximum extraction of nitrogenous material takes place at the pH extremes, with a minimum at and around the isoelectric point. This is as would be expected, but it presents a practical difficulty. It is well known that protein matter acted upon by hardening agents, especially by formaldehyde, at either extreme of acidity or alkalinity, does not possess the desirable characteristics, strength, elasticity, and water resistance that protein matter hardened at or near the isoelectric point possesses. It is true that by picking the pH values carefully and holding closely to them, it would be possible to produce dispersions that would possess the proper characteristics of hardened protein and that would contain a reasonably high percentage of dispersed protein, for example, the pH range of 6.4 to 7.2 would give from 48 to 65 percent dispersed protein. However, it was felt that should there be some other effect, such as a salt effect, that could be brought in, the yield of dispersed protein might be materially improved and the pH range extended somewhat, thus making the process more industrially interesting.

Accordingly, water solutions containing various percentages of formaldehyde and sodium salicylate were used to extract the protein from soybean meal at constant pH value and for different meal ratios, from 2.5 g. to 100 cc. solution to 10.0 g. per 100 cc. solution. As the data were primarily for comparative purposes, the pH of 5.7 was arbitrarily selected, at this pH value a 10-percent formaldehyde solution dispersed 29.5 percent total nitrogen. From a 10-percent solution of sodium salicylate, 2.5 g. soybean meal per 100 cc. extracting solution, room temperature, in 20-percent formaldehyde, 54 percent was extracted; in 10-percent, 63; in 5-percent, 70; in 2-percent, 78. A 10-percent formaldehyde, 10-percent sodium salicylate extracted 56 percent of the total nitrogen from a 10-g. meal sample in 100 cc. extracting solution, while 10-percent formaldehyde with 15 and 5-percent sodium salicylate solutions extracted 77 and 40 percent, respectively, from 10-g. meal samples. In general, it may be stated, the presence of sodium salicylate produces about 5-percent increase in protein dispersion near the isoelectric point, from 10 to 20-percent increase on the alkaline side of the same.

Other salts were tried in place of sodium salicylate and sodium carbonate, trisodium phosphate, sodium tetraborate (borax) and calcium chloride were all found to give improved dispersion of protein in formaldehyde solution. The last gave the greatest increase in protein dispersed at or near the isoelectric point of the protein.

In order to illustrate our invention, the following specific examples are set forth, parts being given by weight:

*Example 1.*—25.0 g. of solvent-extracted soybean meal are shaken up with 1000 g. of a 10-percent aqueous solution of formaldehyde adjusted to a pH of 7.2. Sixty-five percent of the total nitrogenous material was extracted from the meal and dispersed in the formaldehyde solution.

*Example 2.*—50.0 g. of solvent-extracted soybean meal were shaken with 1000 g. of a 10-percent formaldehyde solution, saturated with sodium tetraborate at 25° C. and adjusted to a pH of 8.6. Fifty-five percent of the total nitrogenous material was extracted from the meal and dispersed in the solution.

*Example 3.*—Similar to Example 2 except 100 g. of meal were extracted with the solution adjusted to a pH of 8.4. Forty-five percent of total nitrogenous material extracted.

*Example 4.*—Similar to Example 2, except 50 g. of meal were extracted with 1000 g. of 10-percent sodium carbonate, 10-percent formaldehyde solution at a pH of 10.3. Forty-two percent of total nitrogenous material was extracted.

*Example 5.*—25 g. of solvent-extracted soybean meal and 100 g. of the same were extracted with 10-percent sodium salicylate 10-percent formaldehyde aqueous solutions adjusted to pH of 5.6 and 5.7, respectively. Thirty and 62 percent of the total nitrogenous material were extracted.

*Example 6.*—50 g. of solvent-extracted soybean meal and 100 g. of the same were extracted with 10-percent trisodium phosphate 10-percent formaldehyde aqueous solutions adjusted to pH of 10.8 and 10.7, respectively. Seventy percent of the total nitrogenous material was extracted in each case.

*Example 7.*—25 g. of solvent-extracted soybean meal were extracted with 1000 g. of a 5-percent calcium chloride 10-percent formaldehyde aqueous solution adjusted to a pH of 4.1. Fifty-two percent of the total nitrogenous material was extracted.

*Example 8.*—25 g. of solvent-extracted soybean meal were extracted with 1000 g. of a 5-percent aluminum chloride aqueous solution adjusted to a pH of 2.9 Fifty-five percent of the total nitrogenous material was extracted.

*Example 9.*—25 g. of solvent-extracted soybean meal were extracted with 1000 g. of a 20-percent aqueous solution of propionaldehyde adjusted to a pH of 7.3. Eighty-four percent of the total nitrogenous material was extracted.

*Example 10.*—Same as Example 9, except it was a 20-percent aqueous solution of crotonaldehyde adjusted to a pH of 3.2, and 58 percent of the total nitrogenous material was extracted.

*Example 11.*—Same as Example 9, except it was a 20-percent aqueous solution of acetaldehyde adjusted to a pH of 2.3, and 64 percent of the total nitrogenous material was extracted.

*Example 12.*—Two 25-g. samples of commercial soybean (alpha) protein were extracted with 1000 g. of 10-percent aqueous formaldehyde solutions, one adjusted to a pH of 5.0, the other, 7.0, and 4.0 and 57.0 percent of the total nitrogenous material were extracted, respectively.

*Example 13.*—Three 25-g. samples of rennet casein were extracted with 1000 g. of 10-percent aqueous formaldehyde solutions adjusted to pH of 9.3, 7.4, and 3.2, and 97, 79, and 64 percent, respectively, of the total nitrogenous material were extracted.

*Example 14.*—Three 25-g. samples of lactic acid casein were extracted with 1000 g. of 10-percent aqueous formaldehyde solutions adjusted to pH of 8.0, 7.3, and 2.2, and 63, 93, and 27 percent, respectively, of total nitrogenous material were extracted.

*Example 15.*—Three 25-g. samples of zein from corn were extracted with 1000 g. of 10-percent aqueous formaldehyde solutions adjusted to pH of 10.1, 9.6, and 1.6, and 93, 28, and 0.7 percent, respectively, of total nitrogenous material were extracted.

Although for a matter of convenience 10-percent formaldehyde solutions were generally used throughout the examples cited, we do not wish to be limited to this concentration. We have tried concentrations from one to twenty, and found all to give good results; hence, we wish to set no limit on the concentration of formaldehyde or other hardening agent used. Also we do not wish to limit the concentration of the salt added to assist dispersion near the isoelectric point, nor the quantity of nitrogenous material to be submitted to extraction. Convenience in handling and objective will determine these matters.

Especial attention is called to the fact that zein shows significant dispersion only on the alkaline side of the pH range. Throughout the acid range, the amount extracted is but fractional percentages of the total nitrogenous content.

Having thus described our invention, what we claim for Letters Patent is:

1. An article of manufacture, a hardened protein in aqueous dispersion, which has been obtained by the simultaneous reaction of formaldehyde and sodium salicylate in aqueous solution on solid protein material.

2. An article of manufacture, a hardened protein in aqueous dispersion, which has been obtained by the simultaneous reaction of formaldehyde and calcium chloride in aqueous solution on solid protein material.

GEORGE H. BROTHER.
ALLAN K. SMITH.